US010112347B2

(12) United States Patent
Fuerstenberg

(10) Patent No.: US 10,112,347 B2
(45) Date of Patent: Oct. 30, 2018

(54) APPARATUS AND METHOD FOR MANUFACTURING COMPONENTS FROM A FIBER-REINFORCED COMPOSITE MATERIAL

(71) Applicant: Airbus Operations GmbH, Hamburg (DE)

(72) Inventor: Malte Fuerstenberg, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 412 days.

(21) Appl. No.: 14/823,135

(22) Filed: Aug. 11, 2015

(65) Prior Publication Data

US 2016/0046082 A1    Feb. 18, 2016

(30) Foreign Application Priority Data

Aug. 12, 2014    (DE) .................. 10 2014 215 935

(51) Int. Cl.
*B29C 70/02*    (2006.01)
*B33Y 30/00*    (2015.01)
(Continued)

(52) U.S. Cl.
CPC ............ *B29C 70/021* (2013.01); *B29C 64/00* (2017.08); *B29C 70/30* (2013.01); *B33Y 10/00* (2014.12); *B33Y 30/00* (2014.12)

(58) Field of Classification Search
USPC ....................................................... 264/496
See application file for complete search history.

(56) References Cited

U.S. PATENT DOCUMENTS 5,074,139 A * 12/1991 Elliott ............... H05K 13/0092
                                                        140/105
5,139,710 A    8/1992 Smith
(Continued)

FOREIGN PATENT DOCUMENTS

CA        2102691    11/1992
CN      100418850     1/2007
(Continued)

OTHER PUBLICATIONS

Britnell et al., "Bent pultrusion—a method for the manufacture of pultrudate with controlled variation in curvature", Journal of Materials Processing Technology, 138, 2003, pp. 311-315 (Year: 2003).*
(Continued)

*Primary Examiner* — Jacob T Minskey
*Assistant Examiner* — Baileigh Kate Darnell
(74) *Attorney, Agent, or Firm* — Greer, Burns & Crain, Ltd.

(57) ABSTRACT

An apparatus for manufacturing components from a fiber-reinforced composite material by a generative layer construction process including a control device and a tool head fastened to a carrier arm movable via the carrier arm in three spatial directions. The tool head comprises a feed device configured to feed to the tool head a semi-finished layer comprising reinforcing fibers impregnated with a curable plastic material. A shaping device, via movement of the tool head, applies a force to shape the semi-finished layer. A curing device introduces energy into the semi-finished layer, the energy curing the plastic material in the semi-finished layer. The control device controls the movement of the tool head as well as the operations of the feed device, the shaping device and the curing device wherein semi-finished layers are repeatedly fed, shaped, cured and stacked one on top of another to construct the component layer by layer.

17 Claims, 5 Drawing Sheets

(51) Int. Cl.
    *B29C 64/00*     (2017.01)
    *B29C 70/30*     (2006.01)
    *B33Y 10/00*     (2015.01)

(56) References Cited

U.S. PATENT DOCUMENTS

| | | | |
|---|---|---|---|
| 5,936,861 A * | 8/1999 | Jang | B29C 70/384 |
| | | | 700/98 |
| 6,214,279 B1 | 4/2001 | Yang et al. | |
| 2003/0044593 A1* | 3/2003 | Vaidyanathan | B29B 15/122 |
| | | | 428/297.4 |
| 2003/0236588 A1 | 12/2003 | Jang et al. | |
| 2007/0023572 A1 | 2/2007 | Muller et al. | |
| 2010/0108252 A1 | 5/2010 | Gessler et al. | |
| 2013/0071577 A1* | 3/2013 | Yasukochi | B29C 39/148 |
| | | | 427/521 |
| 2014/0061974 A1 | 3/2014 | Tyler | |
| 2015/0367576 A1* | 12/2015 | Page | B29C 67/0059 |
| | | | 264/257 |

FOREIGN PATENT DOCUMENTS

| | | | |
|---|---|---|---|
| DE | 10 2004 001 078 | 7/2005 | |
| DE | 10 2007 012 608 | 10/2008 | |
| DE | 10 2007 062 111 | 7/2009 | |
| WO | WO 2014153535 A2 * | 9/2014 | B29C 47/004 |

OTHER PUBLICATIONS

German Search Report, dated Aug. 12, 2014.

* cited by examiner

6th layer  
5th layer  
4th layer  
3rd layer  
2nd layer  
1st layer

APPARATUS AND METHOD FOR MANUFACTURING COMPONENTS FROM A FIBER-REINFORCED COMPOSITE MATERIAL

CROSS-REFERENCES TO RELATED APPLICATIONS

This application claims the benefit of the German patent application No. 10 2014 215 935.0 filed on Aug. 12, 2014, the entire disclosures of which are incorporated herein by way of reference.

BACKGROUND OF THE INVENTION

The invention relates to an apparatus and a method for manufacturing components, in particular aircraft components, from a fiber-reinforced composite material.

In aircraft construction, efforts are being made increasingly to use components that comprise wholly or partially of fiber-reinforced composite materials, for example, glass-fiber- or carbon-fiber-reinforced plastic materials. For example, DE 10 2007 062 111 A1 describes a cross-member structure made of carbon-fiber-reinforced plastic material which serves to support the individual panels of an aircraft floor system for separating a passenger cabin from a cargo area arranged beneath the passenger cabin. Furthermore, it is known from DE 10 2004 001 078 A1, or CN 100418850, for example, to provide aircraft fuselage segments with a skin as well as reinforcing elements (e.g., frame, stringer) of fiber-reinforced composite materials.

In the production of aircraft components from fiber-reinforced composite materials, a multilayer laminate may first be constructed from fiber prepregs. The fiber prepregs may comprise a woven fabric or non-crimped fabric of reinforcing fibers, which are provided with a surface layer of a curable plastic material. The laminate may be constructed manually or in an automated manner, support and holding structures frequently being required in particular when producing components of complex shapes in order to bring the components into the desired shape. The plastic material applied to the surfaces of the fibers is finally cured in an autoclave cycle under pressure and/or elevated temperature, so that a composite material having a matrix of a cured plastic material and reinforcing fibers embedded into the matrix is formed.

SUMMARY OF THE INVENTION

An object of the invention is to provide an apparatus and a method which allow components of complex shapes, in particular aircraft components, to be manufactured from a fiber-reinforced composite material without the use of expensive support structures.

An apparatus according to the invention for manufacturing components from a fiber-reinforced composite material by a generative layer construction process comprises a carrier arm as well as a tool head which is fastened to the carrier arm and is movable in three spatial directions by means of the carrier arm. The carrier arm may be in the form of a 6-axis robot arm, for example, which permits free movement of the tool head fastened to the carrier arm in space. The apparatus further comprises a control device. The control device may be configured, for example, to control the movements of the carrier arm and thus of the tool head on the basis of CAD data of the component to be manufactured. The control device further serves to control the operation of further components of the tool head, which will be described in greater detail below.

The tool head of the apparatus comprises a feed device which is configured to feed to the tool head a semi-finished layer which comprises reinforcing fibers impregnated with a curable plastic material. The reinforcing fibers may be, for example, glass fibers, carbon fibers or other suitable reinforcing fibers. The fibers may be impregnated with a resin or another plastic material which may be cured by the introduction of energy, resulting in the formation of a dimensionally stable composite material having a matrix of the cured plastic material and reinforcing fibers embedded into the matrix. The semi-finished layer may comprise reinforcing fibers impregnated with a curable plastic material, which reinforcing fibers are in the form of continuous fibers, fiber bundles, non-crimped fibers or woven fibers. It is important merely that the semi-finished layer is not yet dimensionally stable but can be brought into a desired shape by means of a shaping device of the tool head.

The shaping device is in particular configured to apply a force to the semi-finished layer, by a corresponding movement of the tool head, by means of which force the semi-finished layer is brought into a desired shape. In other words, by means of the shaping device, the semi-finished layer can be brought into a three-dimensional shape which follows the movement of the tool head in space. Complex three-dimensional shapes can thereby be produced in a simple manner. Expensive shaping tools are not required.

The tool head of the apparatus for manufacturing components from a fiber-reinforced composite material further comprises a curing device which is configured to introduce energy into the semi-finished layer brought into the desired shape by means of the shaping device, by means of which energy the plastic material contained in the semi-finished layer is cured. By means of the curing device it is thus possible, immediately after the semi-finished layer has been brought into the desired shape by means of the shaping device, to produce a dimensionally stable layer of the component to be manufactured by curing of the plastic material contained in the semi-finished layer. The dimensionally stable layer acts as a support structure for further component layers which are to be constructed on that layer, so that it is possible to dispense with additional support structures as are used in conventional methods for producing components from fiber-reinforced composite materials.

The control device of the apparatus for manufacturing components from a fiber-reinforced composite material is configured to control the movement of the tool head as well as the operation of the feed device, the shaping device and the curing device in such a manner that semi-finished layers are repeatedly fed, shaped, cured and stacked one on top of another and the component to be manufactured is thereby constructed layer by layer. In other words, the control device, by correspondingly controlling the carrier arm and thus the tool head as well as the components of the tool head, ensures that, for example on the basis of CAD data stored in the control device, the component to be manufactured is constructed layer by layer from semi-finished layers that are shaped and then cured in succession.

Accordingly, by means of the apparatus for manufacturing components it is possible to construct components of complex shapes freely in space by means of a generative layer construction process without using complicated shaping tools and additional support structures. Curing of the plastic material contained in the individual semi-finished layers can take place without an expensive autoclave process and without the use of a vacuum bagging method. The components are distinguished by a low weight as well as excellent mechanical properties and in particular high rigidity. Finally, the apparatus for constructing layer by layer the component to be manufactured allows the reinforcing fibers to be arranged in a manner that is optimized for the force flux in the component because it is possible, by corresponding control of the components of the apparatus, to construct the layers, and thus to position the reinforcing fibers contained in the layers, in such a manner that the flow of the fibers is matched to the force flux in the component.

The feed device provided in the tool head of the apparatus may comprise two mutually opposite feed rollers. The feed rollers may be, for example, rotatable in opposite directions and arranged at such a distance from one another that the semi-finished layer can be guided between the feed rollers and can be fed in a feed direction by being carried along by the feed rollers. Corresponding counter-rotation of the feed rollers then allows the semi-finished layer to be fed through the tool head in a gentle manner that is to say without damaging the semi-finished layer.

In a preferred embodiment of the apparatus for manufacturing components from a fiber-reinforced composite material by a generative layer construction process, the curing device provided in the tool head of the apparatus comprises at least one UV light source which is configured to emit a UV light beam which, based on the feed direction of the semi-finished layer through the tool head, strikes the semi-finished layer after the shaping device. If the curing device is equipped with a UV light source, the curing device is particularly suitable for processing semi-finished layers comprising a plastic material that is curable by means of UV light. If the UV light beam emitted by the UV light source of the curing device, based on the feed direction of the semi-finished layer through the tool head, only strikes the semi-finished layer after the shaping device, it is ensured that the semi-finished layer can still be shaped by the shaping device unhindered. The point of impact of the UV light beam on the semi-finished layer is, however, as close after the shaping device as possible, so that the semi-finished layer can be converted to a dimensionally stable state as soon as possible, that is to say immediately after it has passed through the shaping device.

In a preferred embodiment of the apparatus, the curing device comprises a first and a second UV light source, which light sources are configured to emit a first and a second UV light beam. The UV light beams emitted by the two UV light sources may, based on the feed direction of the semi-finished layer through the tool head, strike two mutually opposite surfaces of the semi-finished layer after the shaping device. In particular, the two UV light beams intersect, based on the feed direction of the semi-finished layer through the tool head, at a focal point located after the shaping device, as a result of which optimized energy input into the semi-finished layer and thus an optimum curing process of the plastic material contained in the semi-finished layer are made possible.

In principle, it is conceivable to process semi-finished layers that comprise any desired reinforcing fibers by means of a curing device that comprises at least one UV light source. Such a curing device is, however, particularly suitable for processing semi-finished layers that comprise reinforcing fibers that transmit UV light, such as, for example, glass fibers.

The shaping device contained in the tool head of the apparatus may comprise a first bearing element which is configured to support the semi-finished layer and, by a corresponding movement of the tool head, to apply to the semi-finished layer a pressure by means of which the semi-finished layer is brought into a desired shape. In addition or alternatively, the shaping device may comprise a second bearing element which is configured to support the semi-finished layer and, by a corresponding movement of the tool head, to apply to the semi-finished layer a pressure by means of which the semi-finished layer is brought into a desired shape. If required, that is to say depending on the shape into which the semi-finished layer is to be brought, the bearing elements of the shaping device may accordingly merely perform a support function or may actively press against the semi-finished layer in order to shape the semi-finished layer as desired. Preferably, the first and the second bearing element are arranged opposite one another and are thus capable of supporting mutually opposite surfaces of the semi-finished layer or applying opposing pressures to the mutually opposite surfaces of the semi-finished layer.

The first and the second bearing element may be movable between a first operating position and a second operating position. In their first operating position, the first and the second bearing element are preferably arranged opposite one another at such a distance from one another that the semi-finished layer can be guided between the first and the second bearing element and is thereby in contact with the first and the second bearing element. For shaping of the semi-finished layer, one of the two bearing elements then applies a pressure to the semi-finished layer, while the other bearing element supports the semi-finished layer and accordingly acts as a counter-bearing to the bearing element applying the pressure to the semi-finished layer. In their first operating position, the first and the second bearing element can gently bring a first semi-finished layer of a component that is to be constructed from a plurality of semi-finished layers into the desired shape. Furthermore, the first and the second bearing element are suitable in their first operating position for gently bringing very thin regions of the component to be manufactured, which are composed, for example, of only one semi-finished layer or of a small number of semi-finished layers, into the desired shape.

In their second operating position, on the other hand, the first and the second bearing element are arranged offset relative to one another in such a manner that the semi-finished layer is supported by only one bearing element and is no longer in contact with the other bearing element. For example, in the second operating position of the first and the second bearing element, one bearing element may be set back relative to the other bearing element, based on the feed direction of the semi-finished layer through the tool head. When the first and the second bearing element are in their second operating position, by a corresponding movement of the tool head, the semi-finished layer can be brought into a desired shape by a pressure applied by the bearing element that is still in contact with the semi-finished layer, without this operation being hindered by the other bearing element. In their second operating position, the bearing elements are accordingly able to process semi-finished layers that are to be bonded to already existing, that is to say already cured, component layers. In particular, the bearing element that is still in contact with the semi-finished layer to be shaped can press the semi-finished layer against the already cured component layers, even if those component layers already have a thickness such that they cannot be guided between the first and the second bearing element in their first operating position.

In a preferred embodiment of the apparatus, the shaping device further comprises a counter-bearing element which is configured to provide a counter-pressure in the second operating position of the first and the second bearing element that is opposite to the pressure applied to the semi-finished layer by the first or the second bearing element. In particular, the counter-bearing element may be brought into contact with component layers that have already been cured and may apply to those component layers a counter-pressure which is opposite to the pressure applied by the first or the second bearing element on the semi-finished layer that is currently to be processed. In particular, the counter-pressure applied by the counter-bearing element and the pressure applied to the semi-finished layer by the bearing element are equal in terms of quantity. By using a counter-bearing element, component layers that have already been cured can effectively be prevented from being undesirably bent or otherwise deformed or even damaged upon application of a further semi-finished layer to the component layers.

The first and/or the second bearing element preferably are comprised of a material that transmits UV light. Similarly, the counter-bearing element may also comprise a material that transmits UV light. It is thus ensured that UV light beams emitted by a UV light source of the curing device pass unhindered through the bearing elements or the counter-bearing element and, based on the feed direction of the semi-finished layer through the tool head, are able to strike the semi-finished layer after the shaping device.

The first and/or the second bearing element may further be in the form of a roller. Similarly, the counter-bearing element may also be in the form of a roller. This permits gentle processing of the semi-finished layers to be shaped. The first and/or the second bearing element may be rotatably fastened to a corresponding bearing element arm, the bearing element arm in each case being able to perform a translational movement in order to move the bearing elements between their first operating position and their second operating position. The counter-bearing element may be rotatably attached to a counter-bearing element arm which is itself rotatable through 360°.

The tool head of the apparatus may further comprise a cutting apparatus for cutting the semi-finished product fed to the tool head. By means of the cutting apparatus, a semi-finished layer may be cut before the carrier arm and thus the tool head are correspondingly moved in order to produce the next layer of the component that is to be constructed layer by layer.

The tool head may further comprise a reservoir for receiving additional curable plastic material. The semi-finished layer may be guided through this reservoir, for example, before it is fed to the shaping device, in order to ensure that a sufficient amount of curable plastic material is contained in the semi-finished layer.

Finally, a shielding device may be provided in the tool head, which shielding device is configured to shield the semi-finished layer, based on the feed direction of the semi-finished layer through the tool head, before the shaping device from the energy emitted by the curing device. The shielding device makes it possible to ensure that partial curing of the plastic material contained in the semi-finished layer does not take place before the semi-finished layer has been brought into the desired shape by the shaping device. The reservoir for receiving additional curable plastic material and the shielding device may be integrated with one another. For example, the reservoir for receiving additional curable plastic material may have a conical shape and be made of a material that does not transmit UV light. The semi-finished layer is then shielded from the UV light emitted by the at least one UV light source of the curing device as it is guided through the reservoir.

In a method according to the invention for manufacturing components from a fiber-reinforced composite material by a generative layer construction process, a semi-finished layer which comprises reinforcing fibers impregnated with a curable plastic material is fed by means of a feed device to a tool head which is fastened to a carrier arm and is movable by means of the carrier arm in three spatial directions. By means of a feed device, a force is applied to the semi-finished layer by a corresponding movement of the tool head, by means of which force the semi-finished layer is brought into a desired shape. The plastic material contained in the semi-finished layer is cured by means of a curing device by the introduction of energy into the semi-finished layer which has been brought into the desired shape. The movement of the tool head as well as the operation of the feed device, the shaping device and the curing device are so controlled that semi-finished layers are repeatedly fed, shaped, cured and stacked one on top of another and the component to be manufactured is thereby constructed layer by layer.

The plastic material contained in the semi-finished layer is preferably cured by a UV light beam which strikes the semi-finished layer after the semi-finished layer has been brought into the desired shape.

In particular, the plastic material contained in the semi-finished layer may be cured by means of a first and a second UV light beam which strike mutually opposite surfaces of the semi-finished layer after the semi-finished layer has been brought into the desired shape.

A first bearing element may support the semi-finished layer and, by a corresponding movement of the tool head, apply to the semi-finished layer a pressure by means of which the semi-finished layer is brought into a desired shape. Alternatively or in addition, a second bearing element may support the semi-finished layer and, by a corresponding movement of the tool head, apply to the semi-finished layer a pressure by means of which the semi-finished layer is brought into a desired shape. Preferably, the two bearing elements apply to the semi-finished layer pressures directed in opposite directions.

The first and the second bearing element may be movable between a first operating position, in which the first and the second bearing element are arranged opposite one another at such a distance from one another that the semi-finished layer may be guided between the first and the second bearing element in contact with the first and the second bearing element, and a second operating position. In their second operating position, the first and the second bearing element are preferably arranged offset relative to one another in such a manner that the semi-finished layer is supported by only one bearing element and, by a corresponding movement of the tool head, may be brought into a desired shape by means of a pressure applied by that bearing element.

In the second operating position of the first and the second bearing element, a counter-pressure is preferably provided by a counter-bearing element, which counter-pressure is opposite to the pressure applied to the semi-finished layer by the first or the second bearing element.

The semi-finished layer fed to the tool head may be cut by a cutting apparatus. Furthermore, the semi-finished layer may be fed through a reservoir for receiving additional curable plastic material before it is fed to the shaping device. Finally, the semi-finished layer may be shielded from the energy emitted by the curing device before the semi-finished layer is brought into a desired shape by the shaping device.

BRIEF DESCRIPTION OF THE DRAWINGS

Preferred embodiments of the invention will now be described in greater detail by means of the accompanying, schematic drawings, in which.

DETAILED DESCRIPTION OF THE PREFERRED EMBODIMENTS

Figure 1:
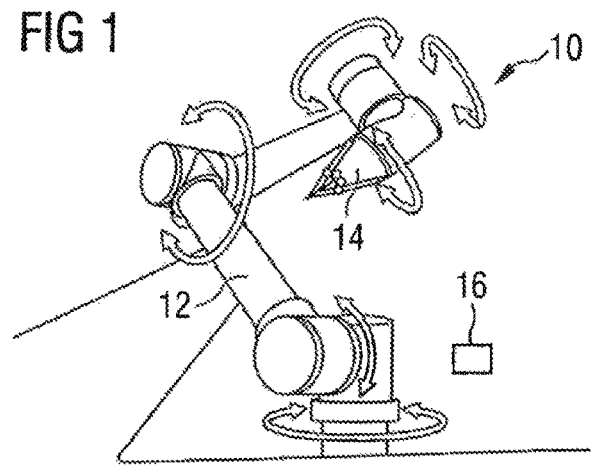
FIG. 1 shows an apparatus for manufacturing components from a fiber-reinforced composite material by a generative layer construction process.

An apparatus 10 shown in FIG. 1 for manufacturing components from a fiber-reinforced composite material by a generative layer construction process comprises a carrier arm 12 as well as a tool head 14 fastened to the carrier arm. The carrier arm 12 is in the form of a 6-axis robot arm, so that the tool head 14 is freely movable in space in all three spatial directions by corresponding movements of the carrier arm 12. The operation of the carrier arm 12 is controlled by means of a control device 16, as is the operation of the components of the tool head 14 that are described hereinbelow.

Figure 2:
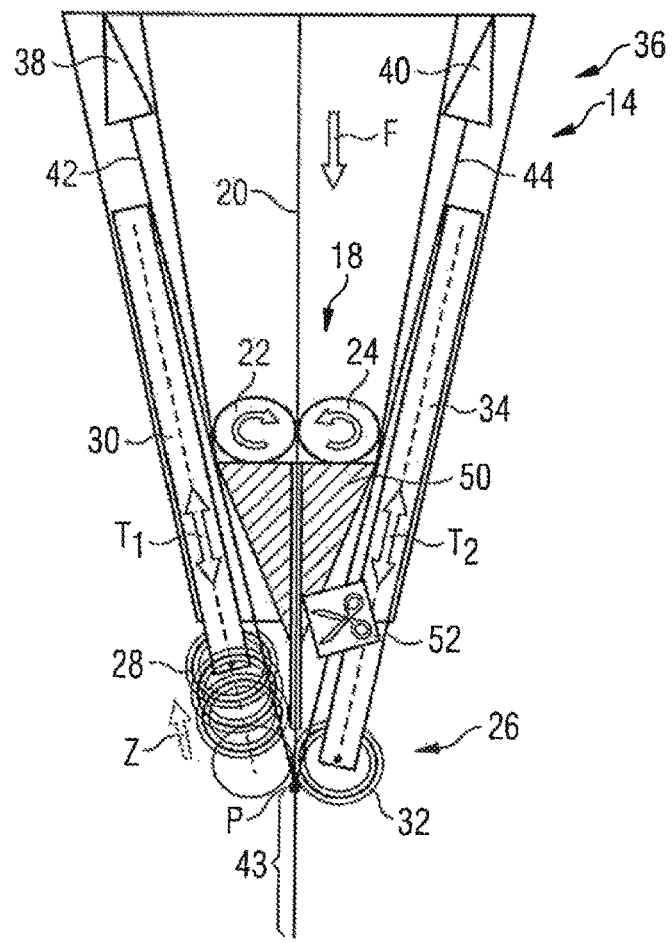
FIG. 2 shows a detailed representation of a tool head of the apparatus according to FIG. 1.
Figure 3:
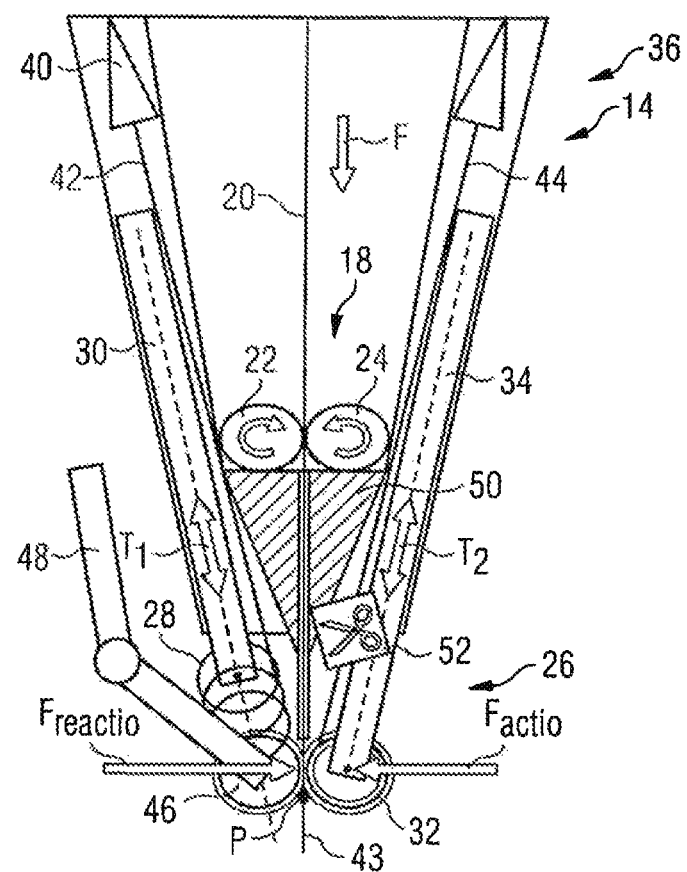
FIG. 3 shows the tool head according to FIG. 2 which, however, is equipped with an additional counter-bearing element.

As is apparent from FIGS. 2 and 3, the tool head 14 comprises a feed device 18 which feeds a semi-finished layer 20 to the tool head 14 and feeds the semi-finished layer 20 through the tool head 14. In the arrangement shown by way of example in the figures, the semi-finished layer 20 contains reinforcing fibers in the form of glass fibers, which are impregnated with a plastic material that is curable by UV light. The feed device 18 comprises two mutually opposite feed rollers 22, 24, which are arranged at such a distance from one another that the semi-finished layer 20 can be guided between the feed rollers 22, 24. The feed rollers 22, 24 are rotatable in opposite directions, that is to say the feed roller 22 is rotatable clockwise, whereas the feed roller 24 is rotatable counter-clockwise. As a result of this counter-rotation of the feed rollers 22, 24, the semi-finished layer 20 is carried along by the feed rollers 22, 24 and fed through the tool head 14 in a feed direction F indicated by an arrow in FIGS. 2 and 3.

A shaping device 26 is further provided in the tool head 14. By a corresponding movement of the tool head 14, the shaping device 26 applies a force to the semi-finished layer 20, by means of which the semi-finished layer 20 is brought into a desired shape. To that end, the shaping device 26 has a first bearing element 28 which is in the form of a roller rotatable about an axis and which is fastened to a first bearing element arm 30. The first bearing element arm 30 is movable in translation along its longitudinal axis, as is indicated in FIGS. 2 and 3 by an arrow T1. The shaping device 26 further comprises a second bearing element 32 which is likewise in the form of a roller rotatable about an axis and which is fastened to a second bearing element arm 34. Like the first bearing element arm 30, the second bearing element arm 34 is also movable in translation along its longitudinal axis, as is indicated in FIGS. 2 and 3 by an arrow T2.

Figure 4:
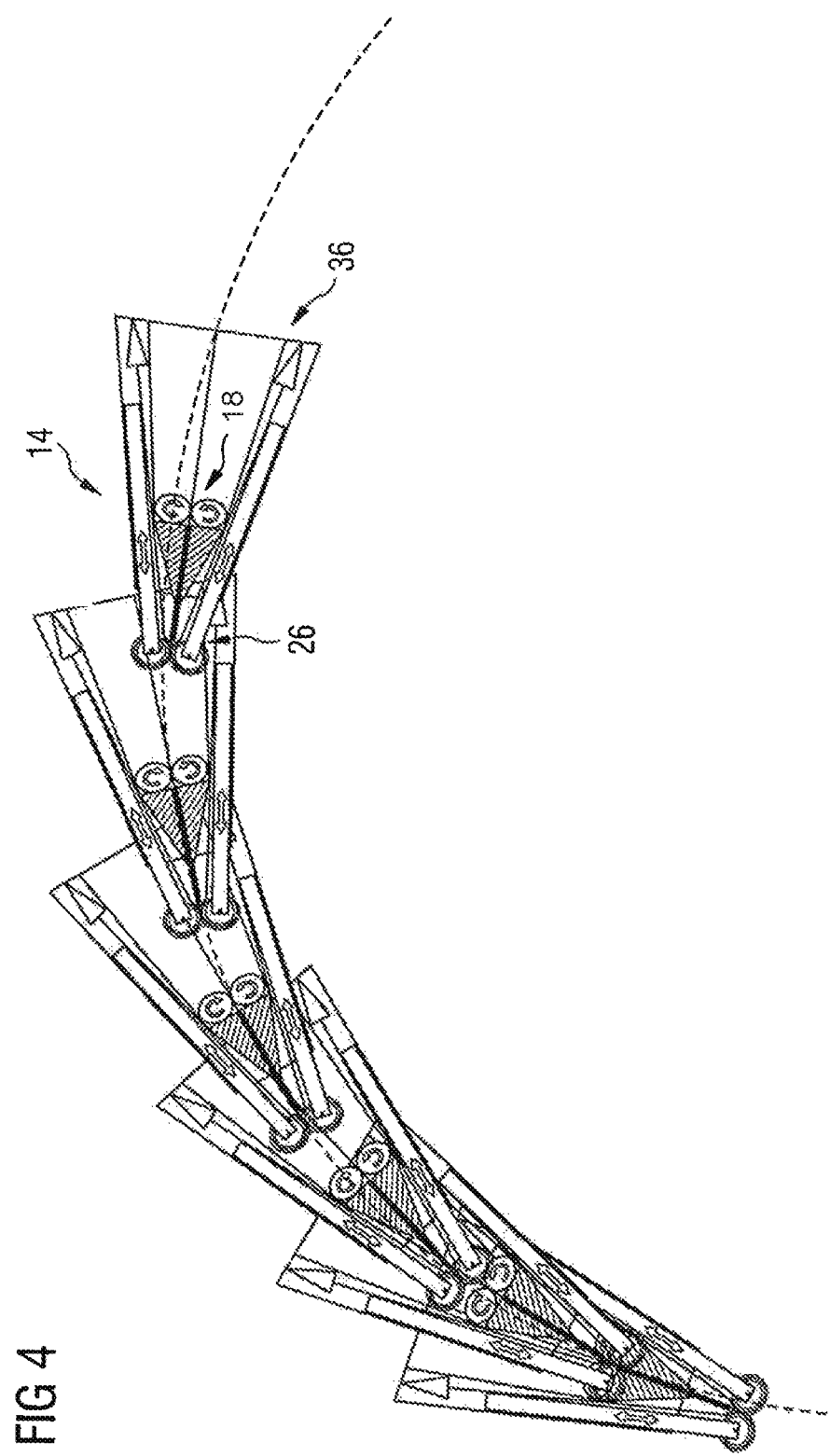
FIG. 4 shows an example of a movement path of the tool head according to FIG. 2 in space.

In a first operating position, the first and the second bearing element 28, 32 are arranged opposite one another at such a distance from one another that the semi-finished layer 20 can be guided between the first and the second bearing element 28, 32 in contact with the first and the second bearing element 28, 32. When the tool head 14, as shown in FIG. 4, is then moved by corresponding movements of the carrier arm 12, for example along a curved path in space, one of the bearing elements 28, 32 applies a pressure to the semi-finished layer 20 and thus brings the semi-finished layer 20 into a desired shape. The other bearing element 28, 32, meanwhile, serves as a counter-bearing which supports the semi-finished layer 20 but, like the bearing element 28, 32 applying the pressure, is in contact with the semi-finished layer 20.

A curing device 36 is further provided in the tool head 14 of the apparatus 10. The curing device 36 serves to introduce energy into the semi-finished layer 20 brought into the desired shape by means of the shaping device 26, by means of which energy the plastic material contained in the semi-finished layer 20 is cured and the semi-finished layer 20 is thus converted to a dimensionally stable component layer 43. The curing device 36 comprises a first and a second UV light source 38, 40. UV light beams 42, 44 emitted by the UV light sources 38, 40 strike two mutually opposite surfaces of the semi-finished layer 20 at a focal point P at which the two UV light beams 42, 44 cross and which, based on the feed direction F of the semi-finished layer 20 through the tool head 14, is located after the shaping device 26. The UV light which thus strikes the semi-finished layer 20 from two sides passes through the semi-finished layer 20 and accordingly ensures reliable curing of the plastic material contained in the semi-finished layer 20. In this manner, the semi-finished layer 20, based on the feed direction F of the semi-finished layer 20 through the tool head 14, is converted to a dimensionally stable component layer 43 immediately after it has passed through the shaping device 26 at the focal point P of the UV light beams 42, 44.

As is apparent from FIGS. 2 and 3, the two bearing elements 28, 32 of the shaping device 26 are movable into a second operating position in which the first and the second bearing element 28, 32 are arranged offset relative to one another. For example, the first bearing element 28, as shown in FIGS. 2 and 3, can be offset relative to the second bearing element 32, by retraction of the first bearing element arm 30 in the direction of the arrow Z, in such a manner that the semi-finished layer 20 is supported only by the second bearing element 32, while the first bearing element 28 is no longer in contact with the semi-finished layer 20.

When the first and the second bearing element 28, 32 are in their first operating position in which the bearing elements 28, 32 are arranged opposite one another and receive the semi-finished layer 20 between them, the shaping device 26 is able to bring a first semi-finished layer 20 of a component that is to be constructed layer by layer, or a thin region of the component which comprises only one semi-finished layer 20 or of a small number of semi-finished layers 20, into the desired shape. By contrast, when the bearing elements 28, 32 are in their second operating position, the shaping device 26 can be used to apply a semi-finished layer 20 to already existing cured component layers 43 without the movement of the tool head 14 being hindered by the bearing element 28, 32 that is no longer in contact with the semi-finished layer 20 to be processed.

In principle, a semi-finished layer 20 can be pressed onto already existing, cured layers 43 of a component that is to be constructed layer by layer simply by applying a pressure to the semi-finished layer 20 by one of the two bearing elements 28, 32 of the shaping device 26. However, this involves the risk that the already cured component layers 43 will be undesirably deformed, in particular if those component layers 43 themselves have a relatively small thickness. The tool head 14 shown in FIG. 3 is therefore equipped with a counter-bearing element 46 which is configured to provide a counter-pressure when the bearing elements 28, 32 of the shaping device 26 are in the second operating position, which counter-pressure is directed against the pressure that is applied to the semi-finished layer 20 by the bearing element 28, 32 that is in contact with the semi-finished layer 20. In the configuration shown in FIG. 3, in which the second bearing element 32 presses with a force Factio against the semi-finished layer, the counter-bearing element 46 provides a force Freactio which is equal in terms of quantity but acts in the opposite direction. The counter-bearing element 46 is in the form of a roller which is rotatable about an axis, and is fastened to a counter-bearing element arm 48 which is rotatable through 360°.

The bearing elements 28, 32 of the shaping device 26 are made of a glass material that transmits UV light, as is the counter-element 36. It is thus ensured that the UV light beams 42, 44 emitted by the UV light sources 38, 40 pass unhindered through the bearing elements 28, 32 or the counter-bearing element 46 and are able to strike the semi-finished layer 20 at the focal point P.

In order to prevent undesirable partial curing of the semi-finished layer 20 before it reaches the shaping device 26, the semi-finished layer 20 is guided through a shielding device 50 made of a material that does not transmit UV light. The shielding device 50 has a conical shape and is arranged between the beam paths of the UV light beams 42, 44. The shielding device 50 is hollow and can therefore perform the dual function of additionally serving as a reservoir for receiving additional curable plastic material. Finally, the tool head 14 is equipped with a cutting apparatus 52 which is shown only schematically in FIGS. 2 and 3 and serves to cut the semi-finished layer 20 fed to the tool head 14 as required.

Figure 5:
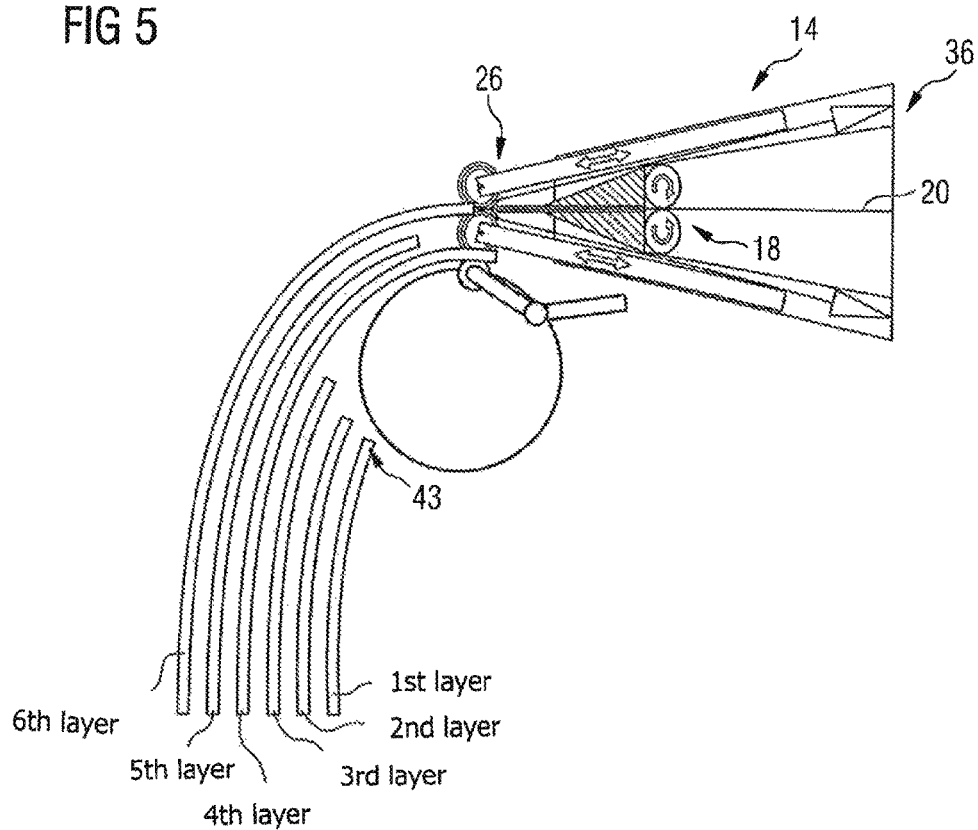
FIG. 5 illustrates the layer-by-layer construction of a component by means of the tool head according to FIG. 2.

As is best apparent from FIG. 5, the control device 16 controls the movement of the tool head 14 as well as the operation of the components of the tool head 14, in particular of the feed device 18, the shaping device 26 and the curing device 36, in such a manner that semi-finished layers 20 are repeatedly fed, shaped, cured and stacked one on top of another in order thereby to construct layer by layer the component that is to be manufactured. The already cured component layers 43 thereby serve to support further semi-finished layers 20, so that additional support structures are not required. Instead, the component to be manufactured is constructed generatively layer by layer freely in space.

Figure 6:
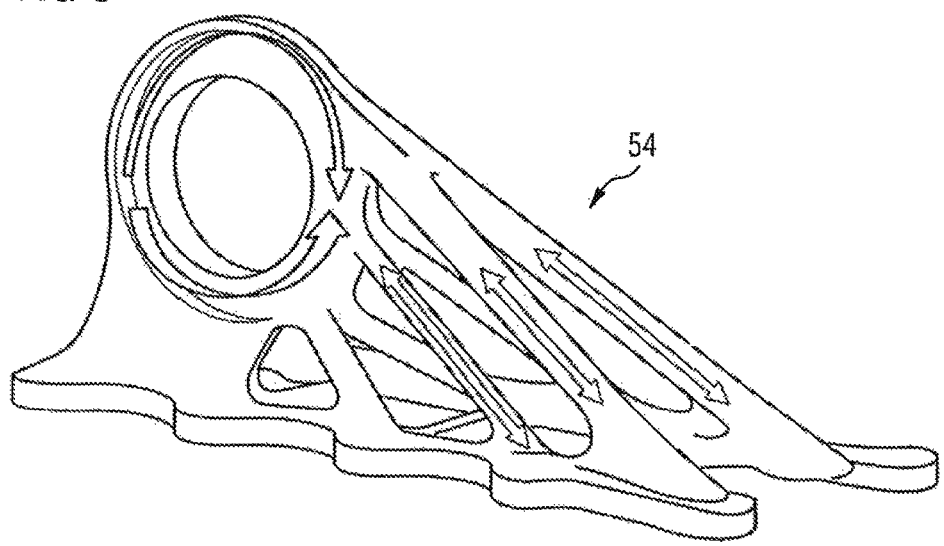
FIG. 6 shows a component produced by means of the apparatus according to FIG. 1.

FIG. 6 shows an example of a component 54 manufactured by means of the apparatus according to FIG. 1. As is clear from this example, even components of very complex shapes can be produced by means of the apparatus 10, for example, on the basis of CAD data stored in the control device 16. Moreover, the control device 16 can control the movement of the tool head 14 as well as the operation of the components of the tool head 14 in such a manner that the component layers 43 are so constructed that the reinforcing fibers contained in the component layers 43 are optimized in terms of their orientation for the force flux in the component 54 indicated in FIG. 6 by the arrows.

Figure 7:
FIG. 7 shows the construction of the component according to FIG. 6 by an alternative method.
Figure 8:
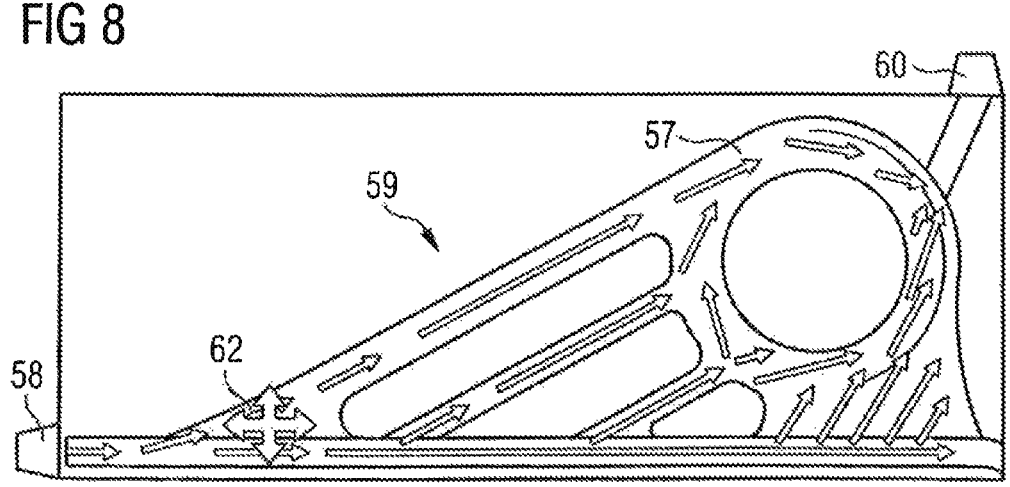
FIG. 8 shows a side view of a semi-finished product for the component according to FIG. 6, which is embedded in a wax block.
Figure 9:
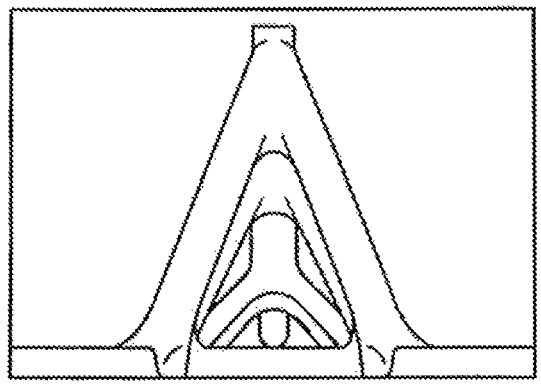
FIG. 9 shows a sectional view of the semi-finished product according to FIG. 8.

FIG. 7 illustrates an alternative method of producing the component 54 shown in FIG. 6. In the method according to FIG. 7, semi-finished layers 20 and wax layers 56 are produced, as required, by two tool heads of an apparatus for manufacturing components from a fiber-reinforced composite material by a generative layer construction process. The wax layers 56 serve as a support structure for semi-finished layers 20 located on the wax layers 56. While the semi-finished layers 20 used in the apparatus 10 described in connection with FIGS. 1 to 5 comprise a curable plastic material in addition to reinforcing fibers, it is possible in the method according to FIG. 7 to process dry semi-finished layers 20, that is to say semi-finished layers 20 that contain only reinforcing fibers. When the construction of semi-finished layers 20 and wax layers 56 is complete, a semi-finished product 57, shown in FIG. 8, of fiber layers that is embedded in a wax block 59 is obtained. The semi-finished product 57 is connected to an inlet valve 58 for supplying a curable plastic material into the semi-finished product 57 and to an outlet valve 60 for discharging excess curable plastic material from the semi-finished product 57.

The curable plastic material can be injected into the semi-finished product 57 through the inlet valve 58, it being possible for the supply of the curable plastic material into the semi-finished product 57 to be assisted by the generation of a low pressure in the semi-finished product 57. To that end there is provided a low pressure valve 62 which can be connected to a low pressure source. The plastic material supplied to the semi-finished product 57 can be cured in an autoclave process under pressure and by supplying heat energy. Finally, the wax block 59 can be melted to leave the finished component 54.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus for manufacturing components from a fiber-reinforced composite material by a generative layer construction process, comprising:
   a carrier arm,
   a tool head fastened to the carrier arm and movable via the carrier arm in three spatial directions,
   a control device,
   the tool head comprising:
      a feed device configured to feed to the tool head a semi-finished layer which comprises reinforcing fibers impregnated with a curable plastic material,
      a shaping device configured, by a corresponding movement of the tool head, to apply to the semi-finished layer a force by means of which the semi-finished layer is brought into a desired shape, and a curing device configured to introduce energy into the semi-finished layer brought into the desired shape via the shaping device, by means of which energy the plastic material contained in the semi-finished layer is cured, the control device being configured to control the movement of the tool head as well as operations of the feed device, the shaping device and the curing device such that semi-finished layers are repeatedly fed, shaped, cured and stacked one on top of another, and the component to be manufactured is thereby constructed layer by layer, wherein the shaping device comprises:

a first bearing element which is configured to support the semi-finished layer and, by a corresponding movement of the tool head, to apply to the semi-finished layer a pressure by means of which the semi-finished layer is brought into a desired shape, and a second bearing element which is configured to support the semi-finished layer and, by a corresponding movement of the tool head, to apply to the semi-finished layer a pressure by means of which the semi-finished layer is brought into a desired shape.

2. The apparatus according to claim 1, wherein the feed device comprises two mutually opposite feed rollers arranged at such a distance from one another that the semi-finished layer can be guided between the feed rollers and can be fed in a feed direction by being carried along by the feed rollers.

3. The apparatus according to claim 1, wherein the curing device comprises at least one UV light source configured to emit a UV light beam which, based on a feed direction of the semi-finished layer, strikes the semi-finished layer after the shaping device.

4. The apparatus according to claim 3, wherein the curing device comprises a first and a second UV light source which are configured to emit a first and a second UV light beam which, based on the feed direction of the semi-finished layer, strike two mutually opposite surfaces of the semi-finished layer after the shaping device.

5. The apparatus according to claim 1, wherein the first and the second bearing element are movable between a first operating position, in which the first and the second bearing element are arranged opposite one another at such a distance from one another that the semi-finished layer can be guided between the first and the second bearing element in contact with the first and the second bearing element, and a second operating position, in which the first and the second bearing element are arranged offset relative to one another in such a manner that the semi-finished layer is supported only by one bearing element and, by a corresponding movement of the tool head, can be brought into a desired shape by a pressure applied by that bearing element.

6. The apparatus according to claim 5, wherein the shaping device further comprises a counter-bearing element configured to provide a counter-pressure in the second operating position of the first and of the second bearing element directed against the pressure applied to the semi-finished layer by the first or the second bearing element.

7. The apparatus according to claim 1, wherein both the first and the second bearing element comprises a material that transmits UV light.

8. The apparatus according to claim 1, wherein at least one of the first and the second bearing element is in the form of a roller.

9. The apparatus according to claim 1, wherein the tool head further comprises at least one of:

a cutting apparatus configured to cut the semi-finished layer fed to the tool head, a reservoir configured to receive additional curable plastic material, and a shielding device configured to shield the semi-finished layer, based on a feed direction of the semi-finished layer, from the energy emitted by the curing device before the shaping device.

10. A method for manufacturing components from a fiber-reinforced composite material by a generative layer construction process, comprising the steps:

feeding a semi-finished layer, which comprises reinforcing fibers impregnated with a curable plastic material, via a feed device to a tool head which is fastened to a carrier arm and is movable via the carrier arm in three spatial directions, applying a pressure to the semi-finished layer via a corresponding movement of the tool head, by means of which pressure the semi-finished layer is brought into a desired shape by means of a bearing element of a shaping device, curing the plastic material contained in the semi-finished layer by introducing energy into the semi-finished layer brought into the desired shape by means of a curing device, and controlling the movement of the tool head as well as the operation of the feed device, the shaping device and the curing device such that semi-finished layers are repeatedly fed, shaped, cured and stacked one on top of another and the component to be manufactured is thereby constructed layer by layer, wherein a first bearing element and a second bearing element supports the semi-finished layer and, by a corresponding movement of the tool head, applies to the semi-finished layer a pressure by means of which the semi-finished layer is brought into a desired shape.

11. The method according to claim 10, wherein the first and the second bearing element are movable between a first operating position, in which the first and the second bearing element are arranged opposite one another at such a distance from one another that the semi-finished layer can be guided between the first and the second bearing element in contact with the first and the second bearing element, and a second operating position, in which the first and the second bearing element are arranged offset relative to one another in such a manner that the semi-finished layer is supported only by one bearing element and, by a corresponding movement of the tool head, can be brought into a desired shape by means of a pressure applied by that bearing element.

12. The method according to claim 10, wherein a counter-bearing element provides a counter-pressure in the second operating position of the first and the second bearing element, which counter-pressure is directed against the pressure applied to the semi-finished layer by the first or the second bearing element.

13. The method according to claim 10, comprising the further step of cutting the semi-finished layer fed to the tool head.

14. The method according to claim 10, comprising the further step of feeding the semi-finished layer through a reservoir for receiving additional curable plastic material.

15. The method according to claim 10, comprising the further step of shielding the semi-finished layer from the energy emitted by the curing device before the semi-finished layer is brought into a desired shape.

16. The method according to claim 10, wherein the plastic material contained in the semi-finished layer is cured via a UV light beam which strikes the semi-finished layer after the semi-finished layer has been brought into the desired shape.

17. The method according to claim 16, wherein the plastic material contained in the semi-finished layer is cured via a first and a second UV light beam which strike two mutually opposite surfaces of the semi-finished layer after the semi-finished layer has been brought into the desired shape.

* * * * *